United States Patent [19]

Furuta et al.

[11] Patent Number: 5,646,209
[45] Date of Patent: Jul. 8, 1997

[54] THERMOPLASTIC RESIN COMPOSITION COMPRISING LIQUID CRYSTALLINE POLYESTER, AROMATIC POLYCARBONATE AND GLASS FIBER

[75] Inventors: Motonobu Furuta, Chiba; Takanari Yamaguchi, Ibaraki, both of Japan

[73] Assignee: Sumitomo Chemical Company, Limited, Osaka, Japan

[21] Appl. No.: 444,686

[22] Filed: May 19, 1995

[30] Foreign Application Priority Data

May 20, 1994 [JP] Japan ................... 6-106656
May 20, 1994 [JP] Japan ................... 6-130950

[51] Int. Cl.$^6$ ............................................. C08L 69/00
[52] U.S. Cl. .................... 524/252; 524/494; 524/537; 525/439; 525/450
[58] Field of Search ........................ 525/439, 450; 524/494, 537, 252

[56] References Cited

U.S. PATENT DOCUMENTS

| | | | |
|---|---|---|---|
| 3,577,378 | 5/1971 | Streib | 524/494 |
| 4,098,754 | 7/1978 | Neuray | 524/494 |
| 4,386,174 | 5/1983 | Cogswell | 525/439 |
| 4,728,698 | 3/1988 | Isayev | 525/439 |
| 4,888,127 | 12/1989 | Wada | 524/847 |

FOREIGN PATENT DOCUMENTS

| | | | |
|---|---|---|---|
| 264290 | 4/1988 | European Pat. Off. | 524/494 |
| 265791 | 5/1988 | European Pat. Off. | |

*Primary Examiner*—David Buttner
*Attorney, Agent, or Firm*—Birch, Stewart, Kolasch & Birch, LLP

[57] ABSTRACT

A thermoplastic resin composition contains a liquid crystalline polyester, an aromatic polycarbonate, glass fibers surfaces of which are not treated and which have a number average fiber diameter of 5 to 25 μm, a number average fiber length of 30 to 1000 μm, and a ratio of a number average fiber length to a number average fiber diameter of 2 to 150, and optionally a diamine. This composition maintains the excellent impact resistance properties of the aromatic polycarbonate and utilizes the high stiffness and heat resistance properties of the liquid crystalline polyester, while improving the a dimensional stability and the stiffness recycling properties of a article formed therefrom.

14 Claims, 2 Drawing Sheets

THERMOPLASTIC RESIN COMPOSITION COMPRISING LIQUID CRYSTALLINE POLYESTER, AROMATIC POLYCARBONATE AND GLASS FIBER

BACKGROUND OF THE INVENTION

1. Field of the Invention

The present invention relates to a thermoplastic resin composition comprising a liquid crystalline polyester, an aromatic polycarbonate, and specific glass fibers.

2. Description of the Related Art

An aromatic polycarbonate is excellent in impact resistance and so on, but it has a problem that it is an amorphous resin so that it deforms greatly at a temperature around its glass transition temperature (150° C.). In a field where higher stiffness is required, a composition comprising the aromatic polycarbonate and milled glass fibers has insufficient stiffness. While a composition comprising the aromatic polycarbonate and chopped glass fibers having a relatively long length has high stiffness, its recycling property is unsatisfactory.

When much higher stiffness is required, a large amount of the glass fibers should be compounded in the aromatic polycarbonate. Then, a weight of the composition is considerably increased, a molded article of such composition has poor appearance, or a screw or a mold of a molding apparatus tends to be damaged.

Different from a crystalline polyester such as polyethylene terephthalate or polybutylene terephthalate, a liquid crystalline polyester does not suffer from tangling of molecules in a molten state since the molecules are stiff, forms a polydomain having a crystal state, and molecular chain are highly orientated in a flow direction at a low shear. Then, the liquid crystalline polyester is generally called as a thermotropic liquid crystal polymer. Because of such specific behaviors, its melt flowability is excellent and it can easily provide a thin-wall molded article having a thickness of about 0.2 to 0.5 mm, and the molded article advantageously has a high strength and high stiffness, while it has drawbacks that its anisotropy is large and its weld strength is very low. In addition, the liquid crystalline polyester has a high profile processing temperature, its range of application is limited. Further, it is expensive, which is another further problem.

Hitherto, as attempts to solve such drawbacks of each of the aromatic polycarbonate and the liquid crystalline polyester, it has been tried to compensate the physical properties of two polymers by a composition which is obtained by melt kneading the aromatic polycarbonate and the liquid crystalline polyester. Such attempts are disclosed, for example, in Japanese Patent Publication No. 60057/1989, and Japanese Patent KOKAI Publication Nos. 225054/1992 and 102257/1990. However, none of the disclosed compositions has sufficient physical properties.

Japanese Patent KOKAI Publication Nos. 86266/1993 and 86267./1983 disclose compositions comprising a liquid crystalline polyester, a thermoplastic resin and an epoxy compound. However, the compositions have insufficient physical properties. Further, it is not necessarily easy to obtain a composition comprising a resin and an epoxy compound, since the compound which does not contribute to a reaction remains in the composition and may deteriorate the physical properties of the composition.

SUMMARY OF THE INVENTION

An object of the present invention is to provide a thermoplastic resin composition which can maintain the excellent impact resistance of the aromatic polycarbonate and utilize the high stiffness and heat resistance of the liquid crystalline polyester, while a dimensional stability and stiffness of a molded article are improved by the addition of a small amount of glass fibers, and which is cheap and excellent in a recycling property.

According to the present invention, there is provided a thermoplastic resin composition comprising 100 parts by weight of a mixture of (A) 1 to 30 wt. % of a liquid crystalline polyester, (B) 99 to 70 wt. % of an aromatic polycarbonate, (C) 1 to 100 parts by weight of glass fibers surfaces of which are not treated and which have a number average fiber diameter of 5 to 25 μm, a number average fiber length of 30 to 1000 μm, and a ratio of a number average fiber length to a number average fiber diameter of 2 to 150, and (D) 0 to 3 parts by weight of a diamine.

DETAILED DESCRIPTION OF THE INVENTION

Figure 1:
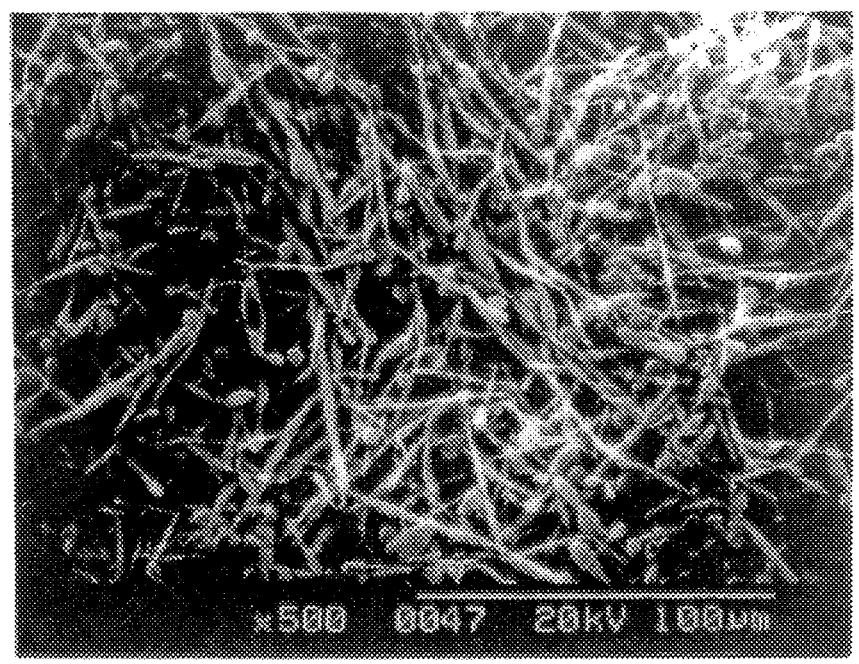
FIGS. 1 and 2 are scanning electron microscopic photographs of the compositions of Comparative Example 1 and Example 1, respectively, after treatment with carbon tetrachloride.

The liquid crystalline polyester used as the component (A) in the composition of the present invention is a polyester which is called as a thermotropic liquid crystalline polymer. Specific examples of such polymer are (1) a polymer comprising an aromatic dicarboxylic acid, an aromatic diol and an aromatic hydroxycarboxylic acid;

(2) a polymer comprising different aromatic hydroxycarboxylic acids;

(3) a polymer comprising an aromatic dicarboxylic acid and an aromatic diol;

(4) a polymer prepared by reacting an aromatic hydroxycarboxylic acid with a polyester such as polyethylene terephthalate.

Such polymer forms an anisotropic melt at a temperature not higher than 400° C.

In place of the aromatic dicarboxylic acid, aromatic diol and aromatic hydroxycarboxylic acid, their ester-forming derivatives may be used.

As the repeating units of the liquid crystalline polyester, the following repeating units can be exemplified.

Repeating unit derived from the aromatic carboxylic acids:

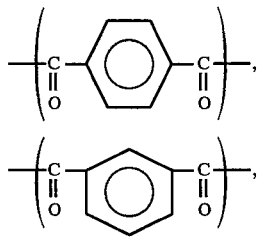

-continued
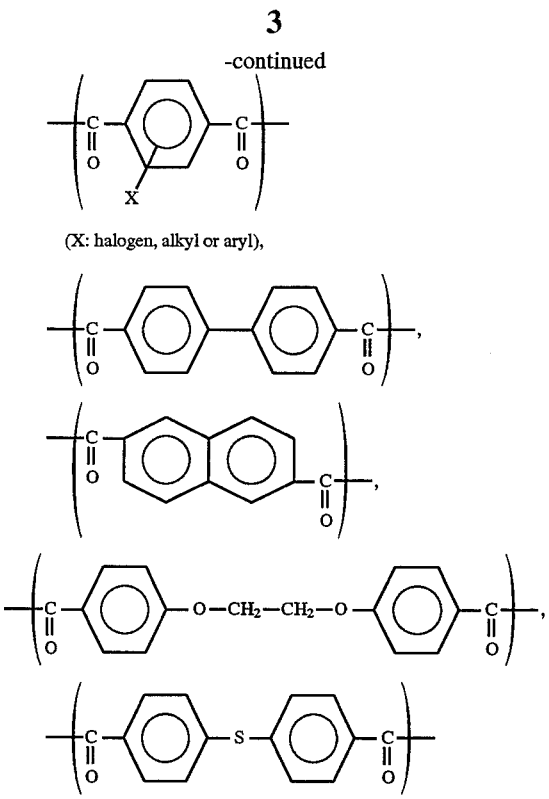
(X: halogen, alkyl or aryl),
Repeating units derived from the aromatic diols:
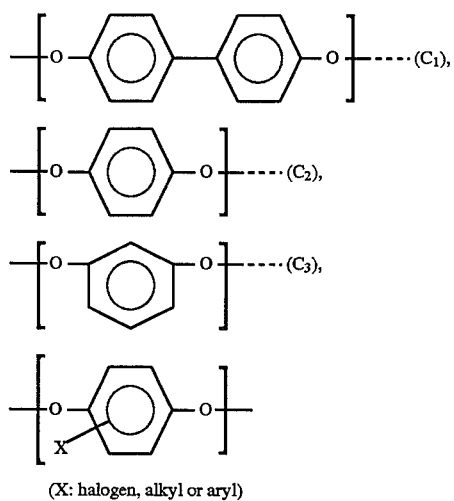
(X: halogen, alkyl or aryl)
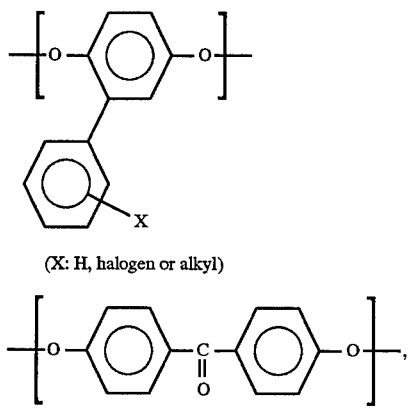
(X: H, halogen or alkyl)
-continued
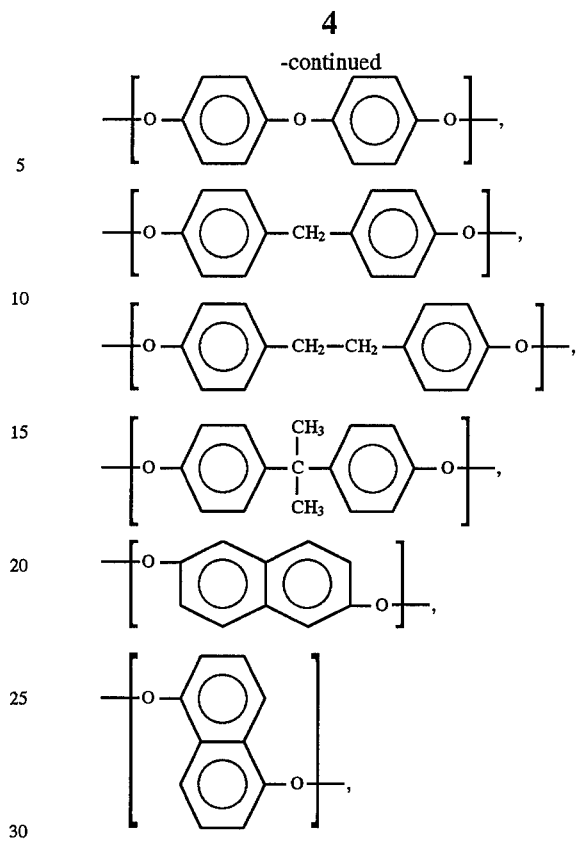
Repeating units derived from the aromatic dicarboxylic acids:
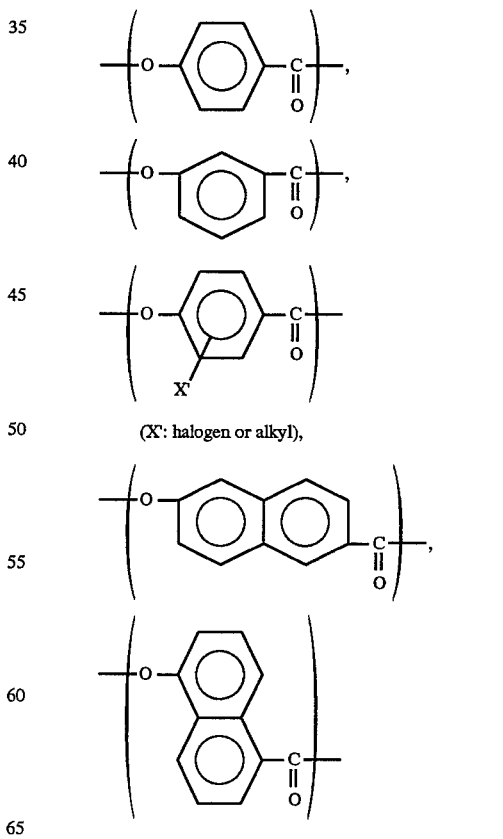
(X': halogen or alkyl),
The particularly preferred liquid crystalline polyester in view of the balance among the heat resistance, the mechanical properties and the processability is one comprising the repeating units of the formula:

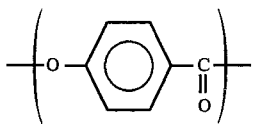

more concretely, the polyester comprising each of the combinations (I) and (II) of the repeating units:

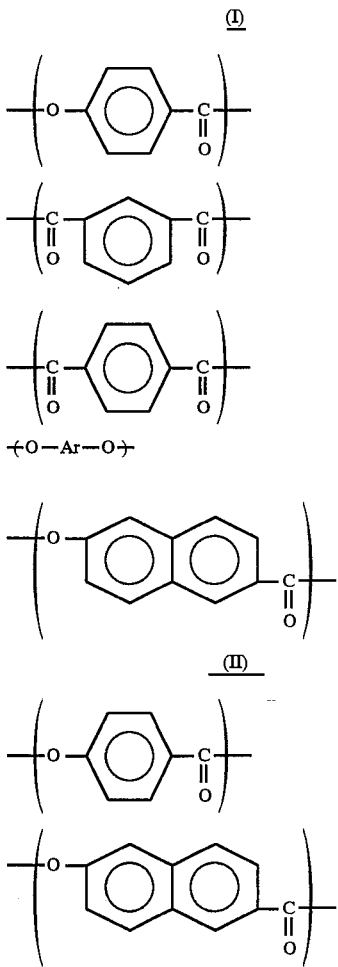

wherein Ar is a divalent aromatic group such as 1,4-phenylene and 4,4'-biphenylene.

The liquid crystalline polyesters (I) and (II) are disclosed in, for example, Japanese Patent Publication Nos. 47870/1972 and 3888/1988, respectively.

As the liquid crystalline polyester (I) as the component (A) in the present invention, a polyester comprising 30 to 80 mol % of the repeating units (a), 0 to 10 mol % of the repeating units (b), 10 to 25 mol % of the repeating units (c), 10 to 35 mol % of the repeating units (d) and 0 to 40 mol % of the repeating units (e) is preferably used. The repeating units (d) are derived from a dihydric aromatic diol. Among them, the above described repeating units $(C_1)$, $(C_2)$ and $(C_3)$, in particular, the repeating units $(C_1)$ are preferred.

As the liquid crystalline polyester (II) as the component (A) in the present invention, an aromatic polyester comprising 30 to 80 mol % of the repeating units (a) and 70 to 20 mol % of the repeating units (e).

The liquid crystalline polyester as the component (A) in the present invention preferably has a flow point of from 240° to 360° C., more preferably from 250° to 340° C. Herein, the flow point means a temperature at which a melt viscosity is 48,000 poise when a resin being heated at a heating rate of 4° C./min. is extruded through a nozzle having an inner diameter of 1 mm and a length of 10 mm under a load of 100 kgf/cm².

When the flow point of the liquid crystalline polyester as the component (A) exceeds 360° C., a temperature in a melt kneading step of the composition should be set high, so that the aromatic polycarbonate as the component (B) may be decomposed unpreferably. When the flow point of the component (A) is lower than 240° C., the heat resistance of the composition is severely decreased.

The aromatic polycarbonate as the component (B) of the thermoplastic resin composition of the present invention is preferably an aromatic polycarbonate comprising repeating units of the formula:

 (VI)

wherein
A is a divalent aromatic group derived from a dihydric phenol,
which is obtained by reacting a dihydric phenol, phosgene, a haloformate, and a carbonate precursor such as a carbonate ester. An aromatic polycarbonate having an iron content of 1 ppm or less and a chlorine content of 50 ppm or less, in particular, 10 ppm or less is preferred.

When either of the iron content and the chlorine content is outside the above range, the resin may be decomposed or foamed during heating.

The iron and chlorine contents are measured by any of conventional analytical methods such as an atomic absorption analysis, an X-ray fluorescence analysis, etc.

Herein, the dihydric phenol means a mono- or polycyclic aromatic compound having two hydroxyl groups which directly bond to carbon atom of the aromatic ring.

Specific examples of the dihydric phenol are 2,2-bis(4-hydroxyphenyl)propane (bisphenol A), hydroquinone, resocinol, 2,2-bis(hydroxyphenyl)pentane, 2,4'-dihydroxydiphenylmethane, bis (2-hydroxyphenyl) methane, bis(4-hydroxyphenyl)methane, bis (4-hydroxy-5-nitrophenyl)methane, 1,1-bis(4-hydroxyphenyl)ethane, 3,3-bis(4-hydroxyphenyl)pentane, 2,2-dihydroxydiphenyl, 2,6-dihydroxynaphthalane, bis(4-hydroxyphenyl)sulfone, 2,4'-dihydroxy-diphenylsulfone, 5-chloro-2,4'-dihydroxydiphenylsulfone, bis(4-hydroxyphenyl) diphenyldisulfone, 4,4-dihydroxydiphenylether, 4,4'-dihydroxy-3,3'-dichlorodiphenyl ether, 4,4'-dihydroxy-2,5-diethoxy-diphenyl ether, and the like. Among them, bisphenol A and its nucleus-substituted derivatives are preferred. These dihydric phenols may be used independently or as a mixture thereof.

The aromatic polycarbonate to use used as the component (B) in the present invention can be prepared from the above dihydric phenol as a raw material by any of conventional methods such as a transesterification method, a solution polymerization method, an interfacial polycondensation method, and so on. The aromatic polycarbonate preferably has a viscosity average molecular weight of at least 15,000, more preferably at least 25,000. The specific polymerization methods are disclosed in ENCYCLOPEDIA OF POLYMER SCIENCE AND TECHNOLOGY, Vol. 10 (John Wiley & Sons, Inc., 1969), pages 710–764 "POLYCARBONATES".

As the aromatic polycarbonate, a copolymer such as a polycarbonate-styrene block copolymer as disclosed in Japanese Patent Publication No. 25076/1973 may be used.

The glass fibers as the component (C) of the thermoplastic resin composition according to the present invention has a number average fiber diameter of 5 to 25 μm, preferably 5 to 20 μm, and a number average fiber length of 30 to 1000 μm, preferably 30 to 300 μm.

When the number average fiber diameter or length is outside the above range, a reinforcing effect of the glass fiber is decreased, so that sufficient stiffness, dimensional stability, processability or recycling property may not be obtained.

In the present invention, a ratio of the number average fiber length to the number average fiber diameter, that is, a number average value of a morphologic ratio (hereinafter referred to as an "aspect ratio") is from 2 to 150, preferably from 3 to 20. When the number average aspect ratio is outside this range, the molded article has poor appearance, the mold processability of the composition is decreased, or the recycling property is insufficient.

The glass fibers to be used as the component (C) are not surface treated. When surface-treated glass fibers are used, the mechanical properties and heat resistance of the composition are deteriorated.

The diamine as the component (D) of the thermoplastic resin composition of the present invention is preferably represented by the formula:

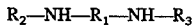

$$R_2\text{—NH—}R_1\text{—NH—}R_3$$

wherein $R_1$ is a straight, branched or cyclic alkylene group having 2 to 12 carbon atoms which may contain an oxygen atom which forms an ether bond, a divalent heterocyclic group, or a substituted or unsubstituted mono- or polycyclic aromatic hydrocarbon group; and $R_2$ and $R_3$ are the same or different and each a hydrogen atom, an alkyl group having 1 to 12 carbon atoms, a cycloalkyl group having 3 to 12 carbon atoms or an aromatic group having 6 to 10 carbon atoms.

Specific examples of the diamine are 1,2-diaminoethane, 1,3-diaminopropane, 1,4-diaminobutane, 1,6-diaminohexane, 1,8-diaminooctane, 1,10-diaminodecane, 1,12-diaminododecane, 1,4-diaminocyclohexane, bis (methylamino)hexane, bis(3-aminopropyl)-ether, 1,2-bis(3-aminopropoxy)ethane, ethylaminoethylamine, methylaminopropylamine, N,N'-di-tert.-butylethylenediamine, bis (2-aminoethyl) benzene, and so on.

Among them, the diamine of the above formula in which at least one of $R_2$ and $R_3$ is hydrogen is preferred. Examples of such diamine are 1,3-diaminopropane, 1,6-diaminohexane, 1,10-diaminodecane, 1,12-diaminododecane, methylaminopropylamine, bis(3-aminoproyl)ether, and the like.

The intended thermoplastic resin composition of the present invention is obtained when the components (A), (B), (C) and (D) are contained in the specific ranges. That is, the components (A) and (B) are used in amounts of 1 to 30 wt. % of the component (A) and 99 to 70 wt. % of the component (B), preferably 2 to 25 wt. % of the component (A) and 98 to 75 wt. % of the component (B).

When the amount of the component (A) is less than 1 wt. % the molded article of the composition has insufficient heat resistance and mechanical properties. When this amount exceeds 3 wt. %, the composition has insufficient dimensional stability, and there is little merit of the cost.

In the thermoplastic resin composition of the present invention, the diamine as the component (D) contained in an amount of 0 to 3 parts by weight, preferably 0.0001 to 3 parts by weight, more preferably from 0.0001 to 2 parts by weight per 100 parts by weight of the sum of the components (A) and (B). The addition of the diamine improves the heat resistance and mechanical properties of the composition. But, when its amount exceeds 3 parts by weight, the heat resistance of the composition is greatly decreased.

The amount of the component (C), that is, the glass fibers is from 1 to 100 parts by weight, preferably from 2 to 60 parts by weight, more preferably from 5 to 40 parts by weight per 100 parts by weight of the sum of the components (A) and (B). When the amount of the component (C) is less than 1 parts by weight, the effect for improving the mechanical strength and dimensional stability of the composition is insufficient. When the amount of the component (C) exceeds 100 parts by weight, the mold processability of the composition is deteriorated, and an injection molded article of the composition has poor appearance.

In the present invention, a suitable morphology of the thermoplastic resin composition is that the liquid crystalline polyester as the component (A) and the specific glass fibers as the component (C) are dispersed mainly in a continuous state in a matrix of the aromatic polycarbonate as the component (B). In such case, the composition has particularly excellent mechanical properties.

A method for preparing the thermoplastic resin composition of the present invention is not limited, and any of conventional methods may be used. For example, the resin components in solution states are mixed with the glass fibers, and then the solvent is evaporated off, or the resin components and the glass fibers are precipitated in a solvent. From the industrial view point, it is preferred to knead the components in a molten state. For melt kneading, a conventionally used kneading apparatus such as a single- or twin-screw extruder, a kneader and so on can be used. In particular, a twin-screw high kneading apparatus is preferred.

In the melt kneading, a cylinder temperature of the kneading apparatus is preferably in a range between 200° C. and 360° C., more preferably between 250° C. and 340° C.

Before kneading, the components may be homogeneously mixed by an apparatus such as a tumbling mixer or a Henschel mixer. If desired, premixing is avoided, and each of the components is metered and directly supplied in the kneading apparatus.

For example, the liquid crystalline polyester and the aromatic polycarbonate are solution blended or melt kneaded to obtain a mixture thereof, and then the mixture and the glass fibers are melt kneaded to obtain the thermoplastic resin composition of the present invention.

Alternatively, the aromatic polycarbonate, the liquid crystalline polyester and the diamine are charged through a first feed opening of the extruder, and the liquid crystalline polyester or the aromatic carbonate and the glass fibers are charged through a second feed opening of the extruder, whereby the thermoplastic resin composition is obtained in a single kneading step.

Further, the liquid crystalline polyester, the aromatic polycarbonate and the diamine are melt kneaded, and then, the kneaded mixture is compounded with the liquid crystalline polyester, the aromatic polycarbonate and the glass fibers and further melt kneaded to obtain the thermoplastic resin composition.

The kneaded resin composition can be molded by any of conventional molding methods such as injection molding, extrusion molding, and so on. It is possible to directly produce a molded article by dry blending the component in the step of injection molding or extrusion molding without prekneading and kneading the component during melt processing to form the resin composition of the present invention.

The thermoplastic resin composition of the present invention may optionally contains an inorganic filler. Examples of the inorganic filler are calcium carbonate, talc, clay, silica, magnesium carbonate, barium sulfate, titanium oxide, alumina, gypsum, carbon fiber, alumina fiber, silica-alumina fiber, aluminum borate whisker, potassium titanate fiber, and so on.

If necessary, the thermoplastic resin composition of the present invention may additionally contain one or more of various additives such as an organic filler, an antioxidant, a heat stabilizer, a light stabilizer, a flame retardant, a lubricant, an antistatic agent, an inorganic or organic colorant, a rust preventive, a cross-linking agent, a foaming agent, a fluorescent, a surface smoother, a surface gloss improver, a releasing improver such as a fluororesin, etc. The additive may be added to the resin composition during the production step or the subsequent processing step.

EXAMPLES

The present invention will be illustrated by the following examples, which do not limit the scope of the present invention in any way.

(1) Liquid crystalline polyester as the component (A)

The liquid crystalline polyester used as the component (A) was prepared as follows:

(i) In a polymerization vessel equipped with comb-shape agitation blades, p-acetoxybenzoic acid (10.8 kg, 60 moles), terephthalic acid (2.49 kg, 15 moles), isophthalic acid (0.83 kg, 5 moles) and 4,4'-diacetoxydiphenyl (5.45 kg, 20.2 moles) were charged and heated to polymerize them at 330° C. for 1 hour while vigorously stirring under a nitrogen atmosphere, during which by-produce acetic acid was removed. Thereafter, the polymerization system was gradually cooled, and the produced polymer was removed from the vessel at 200° C. The obtained polymer was milled by a hammer mill (manufactured by Hosokawa Micron Co., Ltd.) to obtain particles having a diameter of 2.5 mm or less. The particles were further processed in a rotary kiln at 280° C. for 3 hours under the nitrogen atmosphere to obtain a particle-form whole aromatic polyester having a flow point of 324° C. and comprising the following repeating units. This liquid crystalline polyester will be referred to as "A-1". This polymer had optical anisotropy at 341° C. under pressure. The repeating units of the liquid crystalline polyester A-1 were as follows:

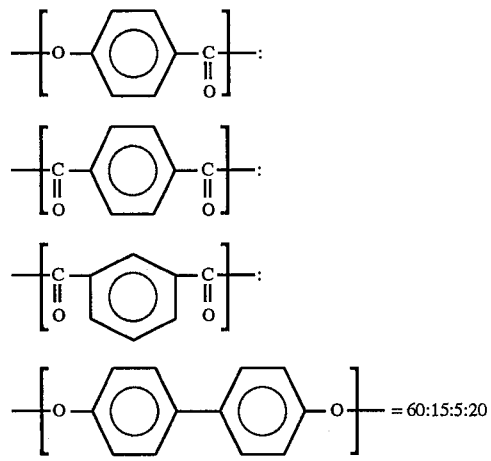

(ii) In a polymerization vessel equipped with comb-shape agitation blades, p-hydroxybenzoic acid (16.6 kg, 12.1 moles), 6-hydroxy-2-naphthoic acid (8.4 kg, 4.5 moles) and acetic anhydride (18.6 kg, 18.2 moles) were charged and heated to polymerize them at 320° C. for 1 hour and then at 320° C. for 1 hour under pressure of 2.0 Torr., while stirring under a nitrogen atmosphere, during which by-produced acetic acid was removed continuously. Thereafter, the polymerization system was gradually cooled, and the produced polymer was removed from the vessel at 180° C. The obtained polymer was milled in the same manner as in the above (i), and further processed in a rotary kiln at 240° C. for 5 hours under the nitrogen atmosphere to obtain a particle-form whole aromatic polyester having a flow point of 270° C. and comprising the following repeating units. This liquid crystalline polyester will be referred to as "A-2". This polymer had optical anisotropy at 280° C. under pressure. The repeating units of the liquid crystalline polyester A-2 were as follows:

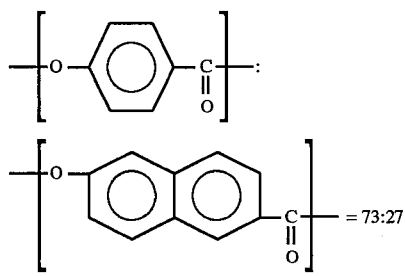

(2) Aromatic polycarbonate as the component (B)

As the component (B), the following aromatic carbonates were used:

b-1: CALIBRE (trademark) 200-3 manufactured by Sumitomo Dow Ltd. (Fe content<1 ppm, CI content=1 ppm, MFR (melt flow ratio) at 300° C. under a load of 1.2 kg=3).

b-2: CALIBRE (trademark) 300-10 manufactured by Sumitomo Dow Ltd. (Fe content<1 ppm, CI content=2 ppm, MFR at 300° C. under a load of 1.2 kg=10).

b-3: CALIBRE (trademark) 300-22 manufactured by Sumitomo Dow Ltd. (Fe content<1 ppm, CI content=2 ppm, MFR at 300° C. under a load of 1.2 kg=22).

B-1: CALIBRE (trademark) 300-4 manufactured by Sumitomo Dow Ltd. (Fe content<1 ppm, CI content=1 ppm, MFR at 300° C. under a load of 1.2 kg=4).

B-2: CALIBRE (trademark) 300-15 manufactured by Sumitomo Dow Ltd. (Fe content<1 ppm, CI content=2 ppm, MFR at 300° C. under a load of 1.2 kg=15).

B-3: CALIBRE (trademark) 300-6 manufactured by Sumitomo Dow Ltd. (Fe content<1 ppm, CI content=1 ppm, MFR at 300° C. under a load of 1.2 kg=6).

(3) Glass fiber as the component (C)

The glass fibers used as the component (C) were as follows:

C-1: EFH 75-01 (trade name) manufactured by Central Glass Co., Ltd. Number average diameter=13 μm, number average fiber length=50 μm, aspect ratio=3.8. No surface treatment.

C-2: REV 8 (trade name) manufactured by Nippon Plate Glass Co., Ltd. Number average diameter=13 μm, number average fiber length=70 μm, aspect ratio=5.4. Surface treated with aminosilane.

C-3: RES 03-TP75 (trade name) manufactured by Nippon Plate Glass Co., Ltd. Number average diameter=10 μm, number average fiber length=3 mm, aspect ratio=300. Surface treated with a silane coupling agent.

C-4: CS 03 MAPX 1 (trade name) manufactured by Central Glass Co., Ltd. Number average diameter=13 μm, number average fiber length=3 mm, aspect ratio=230. Surface treated with a silane coupling agent.

(4) Diamine as the component (D)
As the component (D), the following diamines were used:
D-1: 1,12-Diaminododecane.
D-2: 1,6-Diaminohexane.

Measurements of Physical Properties

Temperature of Deflection under Load (TDUL):
A test specimen for the TDUL measurement (127 mm long×12.7 mm wide and 6.4 mm thick) is formed, and subjected to the TDUL measurement (under a load of 18.6 kg) according to ASTM D648.

Flexural modulus:
The flexural modulus is measured with a specimen (6.4 mm thick or 3.2 mm thick) according to ASTM D790.

Izod Impact Strength:
The Izod impact strength is measured with a specimen (without notch) (6.4 mm thick) according to JIS K 7110.

Tensile Strength:
An ASTM No. 4 dumbbell is formed, and the tensile strength is measured according to ASTM D638.

Molding Shrinkage:
A size of a molded article in a machine direction or a transverse direction is measured, and a ratio of the measured size to a size of a mold is calculated.

Coefficient of Linear Expansion:
From an ASTM No. 4 dumbbell piece, a specimen of 6 mm×6 mm×2.5 mm is cut out along the machine direction, and a coefficient of linear expansion in the machine direction is measured in a temperature range between room temperature and 80° C.

Recycling Property:
A resin composition obtained by melt kneading and injection molding is ground using a grinder VB-360 (manufactured by HORAI TEKKO Co. Ltd.). Then, the ground material is injection molded under the same conditions as described above. The molded article is again ground and injection molded, and the physical properties of the molded article are measured, whereby, the recycling property of the resin composition is evaluated.

Morphological Observation:
A mall piece of the molded article is dipped in carbon tetrachloride and kept standing overnight at room temperature. Floating particles in carbon tetrachloride are collected and dried. Then, the floating particles are vapor metal deposited and observed with a scanning electron microscope. The morphology of the material is classified as follows:

A: Mainly the components (A) and (C) are present continuously.
B: Mainly the component (A) is domain.

Example 1 and Comparative Examples 1–3

Components were mixed in a composition shown in Table 1 by a Henschel mixer and kneaded by a twin-screw extruder (PCM-30 manufactured by Ikegai Tekko Co., Ltd.) at a cylinder temperature of 290° to 334° C. while evaporating volatiles. Then, the composition was injection molded using an injection molding machine (PS40 E5 ASE manufactured by Nissei Jushi Kogyo Co., Ltd.) at a molding temperature of 290° to 334° C. and a mold temperature of 80° to 100° C. With the injection molded article, its physical properties were measured and its morphology was observed in the above described manners.

Figure 2:
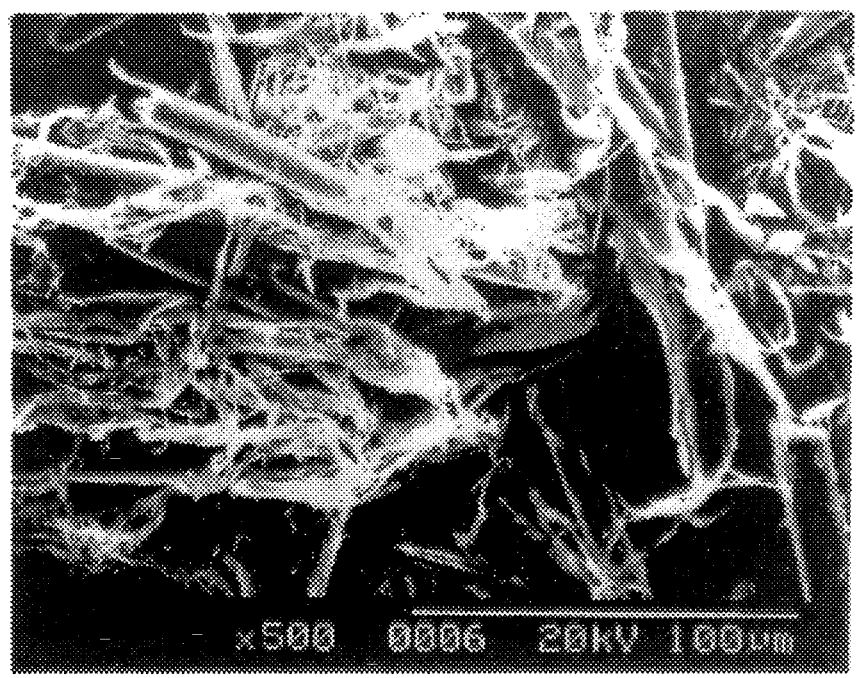

The results are shown in Table 1 and FIGS. 1 and 2 which are scanning electron microscopic photographs of the compositions of Comparative Example 1 and Example 1, respectively.

In the composition of Comparative Example 1, mainly the component (A) was domain (FIG. 1), and with the compositions of Comparative Examples 2 and 3, no floating particle was found in carbon tetrachloride. In contrast, in the composition of Example 1, mainly the components (A) and (C) were present continuously, and its physical properties were better than those of the compositions of Comparative Examples 1, 2 and 3.

TABLE 1

| Ex. No. | Composition (wt. parts) | | | Physical properties | | Morpho-logy |
|---|---|---|---|---|---|---|
| | (A) | (B) | (C) | TDUL (°C.) | Flexural modulus 3.2 mmt (kg/cm$^2$) | |
| 1 | A-1 (9) | b-1 (91) | C-1 (11) | 151 | 33900 | A |
| C. 1 | A-1 (9) | b-1 (91) | C-2 (11) | 144 | 25600 | B |
| C. 2 | — | b-1 (100) | C-1 (11) | 141 | 23700 | *1) |
| C. 3 | — | b-1 (100) | C-1 (35) | 145 | 29200 | *1) |

Note: *1) No floating particle was found in carbon tetrachloride.

Examples 2–4 and Comparative Examples 4–5

Components were mixed in a composition shown in Tables 2 and 3 by a Henschel mixer and kneaded by a twin-screw extruder (PCM-30 manufactured by Ikegai Tekko Co., Ltd.) at a cylinder temperature of 295° to 335° C. while evaporating volatiles. Then, the composition was injection molding using an injection molding machine (PS40 E5 ASE manufactured by Nissei Jushi Kogyo Co., Ltd.) at a molding temperature of 295° to 335° C. and a mold temperature of 90° to 120° C. With the injection molded article, its physical properties were measured and its morphology was observed in the above described manners.

The results are shown in Tables 2 and 3.

TABLE 2

| Ex. No. | Composition (wt. parts) | | | Physical properties | | | Physical properties of recycled article | | |
|---|---|---|---|---|---|---|---|---|---|
| | (A) | (B) | (C) | Izod impact strength (kg · cm/ cm) | Flexural modulus 3.2 mmt (kg/cm$^2$) | TDUL (°C.) | Izod impact strength (kg · cm/ cm) | Flexural modulus 3.2 mmt (kg/cm$^2$) | TDUL (°C.) |
| 2 | A-1 (11) | b-2 (86) | C-1 (13) | 61 | 27400 | 151 | 64 | 29200 | 149 |
| C.4 | A-1 (11) | b-2 (86) | C-3 (13) | 55 | 30200 | 152 | 31 | 26400 | 140 |

TABLE 3

| Ex. No. | Composition (wt. parts) | | | Physical properties | |
|---|---|---|---|---|---|
| | (A) | (B) | (C) | TDUL (°C.) | Flexural modulus (kg/cm$^2$) |
| 3 | A-2 (25) | b-3 (75) | C-1 (18) | 171 | 43800 |
| 4 | A-2 (25) | b-3 (75) | C-1 (33) | 182 | 61500 |
| C.5 | A-2 (100) | — | — | 181 | 57000 |

Examples 5–10 and Comparative Examples 6–11

Components were mixed in a composition shown in Tables 4 and 5 by a Henschel mixer and kneaded by a twin-screw extruder (PCM-30 manufactured by Ikegai Tekko Co., Ltd.) at a cylinder temperature of 322° C. and a screw rotation of 90 rpm while evaporating volatiles. Then, the composition was injection molding using an injection molding machine (PS40 E5 ASE manufactured by Nissei Jushi Kogyo Co., Ltd.) at a molding temperature of 334° C. and a mold temperature of 100° C. With the injection molded article, its physical properties were measured was observed in the above described manners.

The results are shown in Tables 6 and 7.

TABLE 4

| Ex. No. | Composition (wt. parts) | | | |
|---|---|---|---|---|
| | (A) | (B) | (D) | (C) |
| 5 | A-1 (10) | B-1 (90) | D-1 (0.002) | C-1 (10) |
| C.6 | A-1 (10) | B-1 (90) | D-1 (0.002) | C-4 (10) |
| C.7 | A-1 (10) | B-1 (90) | D-1 (0.002) | C-2 (10) |

TABLE 5

| Ex. No. | Composition (wt. parts) | | | |
|---|---|---|---|---|
| | (A) | (B) | (D) | (C) |
| 6 | A-1 (10) | B-1 (90) | D-1 (0.004) | C-1 (10) |
| 7 | A-1 (10) | B-1 (90) | D-1 (0.004) | C-1 (20) |
| 8 | A-1 (10) | B-1 (90) | D-1 (0.004) | C-1 (40) |
| C.8 | A-1 (10) | B-1 (90) | D-1 (0.004) | — |
| C.9 | A-1 (10) | B-1 (90) | — | — |
| C.10 | — | B-1 (100) | — | C-1 (10) |
| C.11 | — | B-1 (100) | — | C-1 (20) |
| 9 | A-1 (5) | B-2 (95) | D-1 (0.002) | C-1 (12) |
| 10 | A-2 (27) | B-2 (73) | D-1 (0.002) | C-1 (24) |

TABLE 6

| | Physical properties | | | Physical properties of recycled article | | |
|---|---|---|---|---|---|---|
| Ex. No. | Izod impact strength (kg · cm/cm) | Tensile strength (kg/cm$^2$) | Flexural modulus 6.4 mmt (kg/cm$^2$) | Izod impact strength (kg · cm/cm) | Tensile strength (kg/cm$^2$) | Flexural modulus 6.4 mmt (kg/cm$^2$) |
| 5 | 66 | 750 | 26500 | 73 | 740 | 29000 |
| C.6 | 54 | 730 | 30600 | 38 | 610 | 29800 |
| C.7 | 51 | 630 | 22700 | 43 | 590 | 21500 |

TABLE 7

| Ex. No. | Izod impact strength (kg·cm/cm) | Tensile strength (kg/cm$^2$) | Flexural test | | Molding shrinkage | | Coefficient of linear expansion (/°C.) × 10$^{-5}$ |
|---|---|---|---|---|---|---|---|
| | | | Flexural modulus 6.4 mmt (kg/cm$^2$) | Flexural strength 6.4 mmt (kg/cm$^2$) | Machine direction (%) | Transverse direction (%) | |
| 6 | 63 | 780 | 34200 | 1170 | 0.5 | 0.4 | 3 |
| 7 | 44 | 730 | 41800 | 1210 | 0.3 | 0.3 | 3 |
| 8 | 33 | 700 | 51300 | 1150 | 0.3 | 0.2 | 3 |
| C.8 | 81 | 720 | 25000 | 1090 | 0.6 | 0.6 | 4 |
| C.9 | 67 | 680 | 21400 | 870 | 0.6 | 0.6 | 4 |
| C.10 | 41 | 570 | 23000 | 1010 | 0.7 | 0.5 | 6 |
| C.11 | 20 | 480 | 30800 | 1070 | 0.5 | 0.4 | 6 |
| 9 | 79 | 750 | 32500 | 1120 | 0.3 | 0.3 | 3 |
| 10 | 53 | 710 | 49100 | 970 | 0.3 | 0.2 | 3 |

Example 11 and Comparative Examples 12–13

Components were mixed in a composition shown in Table 8 by a Henschel mixer and kneaded by a twin-screw extruder (PCM-30 manufactured by Ikegai Tekko Co., Ltd.) at a cylinder temperature of 275° C. and a screw rotation of 80 rpm while evaporating volatiles. Then, the composition was injection molding using an injection molding machine (PS40 E5 ASE manufactured by Nissei Jushi Kogyo Co., Ltd.) at a molding temperature of 280° C. and a mold temperature of 70° C. With the injection molded article, its physical properties were measured in the above described manners.

The results are shown in Table 8.

TABLE 8

| Ex. No. | Composition (wt. parts) | | | | Izod impact strength (kg·cm/cm) | Tensile strength (kg/cm$^2$) | Flexural modulus 6.4 mmt (kg/cm$^2$) |
|---|---|---|---|---|---|---|---|
| | (A) | (B) | (D) | (C) | | | |
| 11 | A-2 (16) | B-3 (84) | D-2 (0.01) | C-1 (19) | 37 | 890 | 45800 |
| C.12 | A-2 (16) | B-1 (84) | D-2 (0.01) | C-2 (19) | 25 | 710 | 37800 |
| C.13 | A-2 (100) | — | — | — | 73 | 1810 | 57300 |

Effects of the Invention

The thermoplastic resin composition of the present invention can maintain the excellent impact resistance of the aromatic polycarbonate and utilize the high stiffness and heat resistance of the liquid crystalline polyester, while a dimensional stability and stiffness of a molded article are improved by the addition of a small amount of glass fibers, and the composition is cheap and excellent in a recycling property.

By making use of such properties, the thermoplastic resin composition of the present invention can be shaped by injection molding or extrusion molding in the form of a molded article, a sheet, a tube, a film, fibers, a laminate, a coating material.

What is claimed is:

1. A thermoplastic resin composition comprising 100 parts by weight of a mixture of: (A) 1 to 30 wt. % of a liquid crystalline polyester, (B) 99 to 70 wt. % of an aromatic polycarbonate, (C) 1 to 100 parts by weight of glass fibers surfaces of which are not treated and which have a number average fiber diameter of 5 to 25 μm, a number average fiber length of 30 to 1000 μmm, and a ratio of number average fiber length to number average fiber diameter of 2 to 150, and (D) 0.0001 to 3 parts by weight of a diamine.

2. The thermoplastic resin composition according to claim 1, which is prepared by melt kneading a first portion of said component (A), a first portion of said component (B) and said component (C) to form a first resin composition; and melt kneading said first resin composition with a second portion of said component (A), a second portion of said component (B) and said component (D).

3. The thermoplastic resin composition according to claim 1, wherein said liquid crystalline polyester comprises 30 to 80 mol % of the following repeating units (a), 0 to 10 mol % of the following repeating units (b), 10 to 25 mol % of the following repeating units (c), 10 to 35 mol % of the following repeating units (d) and 0 to 40 mol % of the following repeating units (e):

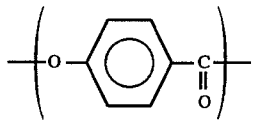 (a)

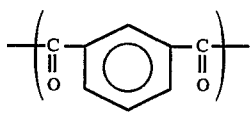 (b)

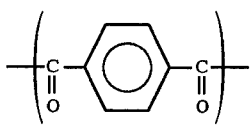 (c)

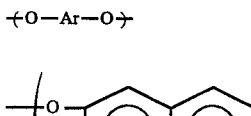 (d)

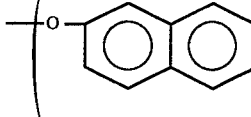 (e)

wherein Ar is a divalent aromatic group, and said aromatic polycarbonate has an iron content of 1 ppm or less and chlorine content of 50 ppm or less.

4. The thermoplastic resin composition according to claim 1, wherein said liquid crystalline polyester as the component (A) has a flow point of 240° to 360° C., when the flow point is defined as a temperature at which a melt viscosity is 48,000 poise when a resin being heated at a heating rate of 4° C./min. is extruded through a nozzle having an inner diameter of 1 mm and a length of 10 mm under a load of 100 kgf/cm$^2$.

5. The thermoplastic resin composition according to claim 1, wherein said components (A) and (C) are mainly present continuously in a matrix of said component (B).

6. The thermoplastic resin composition according to claim 1, which is prepared by melt kneading a resin composition which has been obtained by melt kneading said liquid crystalline polyester, said aromatic polycarbonate and said diamine, together with said liquid crystalline polyester, said aromatic polycarbonate and said glass fibers.

7. The thermoplastic resin composition according to claim 1, wherein said liquid crystalline polyester comprises 30 to 80 mol % of the following repeating units (a) and 70 to 20 mol % of the following repeating units (e), and contains 1 ppm or less of iron and 50 ppm or less of chlorine:

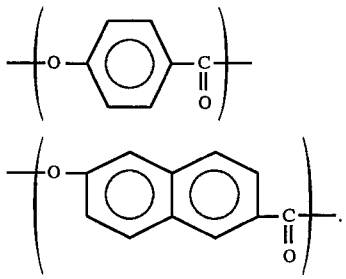

8. The thermoplastic resin composition according to claim 1, wherein said component (B) is an aromatic polycarbonate comprising repeating units of the formula:

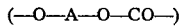 (VI)

wherein A is a divalent aromatic group derived from a dihydric phenol.

9. The thermoplastic resin composition according to claim 1, wherein said component (B) has an iron content of 1 ppm or less and a chlorine content of 50 ppm or less.

10. The thermoplastic resin composition according to claim 1, wherein said glass fibers of component (C) have a number average fiber diameter of 5 to 20 μm, a number average fiber length of 30 to 300 μm, and a ratio of number average fiber length to number average fiber diameter of 3 to 20.

11. The thermoplastic resin composition according to claim 1, wherein said component (D) is a diamine selected from the group consisting of 1,2-diaminoethane, 1,3-diaminopropane, 1,4-diaminobutane, 1,6-diaminohexane, 1,8-diaminooctane, 1,10-diaminodecane, 1,12-diaminododecane, 1,4-diaminocyclohexane, bis(methylamino) hexane, bis(3-aminopropyl)ether, 1,2-bis(3-aminopropoxy)ethane, ethylaminoethylamine, methylaminopropylamine, N,N'-di-tert.-butylethylenediamine, and bis(2-aminoethyl)benzene.

12. The thermoplastic resin composition according to claim 1, wherein said component (D) is a diamine selected from the group consisting of 1,3-diaminopropane, 1,6-diaminohexane, 1,10-diaminodecane, 1,12-diaminododecane, methylaminopropylamine, and bis(3-aminopropyl)ether.

13. The thermoplastic resin composition according to claim 1, wherein said component (C) is present in an amount of 5 to 40 parts by weight.

14. The thermoplastic resin composition according to claim 1, wherein said component (A) is present in an amount of 2 to 25 wt. %, and said component (B) is present in an amount of 98 to 75 wt. %.

* * * * *